United States Patent [19]

Gertel

[11] Patent Number: 5,061,541
[45] Date of Patent: Oct. 29, 1991

[54] HONEYCOMB TABLES

[75] Inventor: Maurice Gertel, Roslindale, Mass.

[73] Assignee: Kinetic Systems, Inc., Roslindale, Mass.

[21] Appl. No.: 457,581

[22] Filed: Dec. 27, 1989

[51] Int. Cl.$^5$ .............................................. B32B 3/12
[52] U.S. Cl. ..................................... 428/116; 52/806; 156/292; 428/131; 428/138
[58] Field of Search ................ 156/292; 428/116, 117, 428/118, 131, 138, 73; 52/806

[56] References Cited

U.S. PATENT DOCUMENTS

| 3,104,194 | 9/1963 | Zahorski | 428/118 X |
| 4,621,006 | 11/1986 | Terry et al. | 428/116 |
| 4,645,171 | 2/1987 | Heide | 428/116 X |

Primary Examiner—Henry F. Epstein
Attorney, Agent, or Firm—Fish & Richardson

[57] ABSTRACT

The invention features a honeycomb table including a top facing sheet that may be perforated with openings, a bottom facing sheet, at least one layer of rigid corrugated material comprised of valleys and crests, at least one layer of honeycomb core, and preferably at least one internal stiffening sheet in preferably a permanently laminated composite. The longitudinal axes of the crests and valleys of the rigid corrugated material are aligned generally parallel to the top and bottom facing sheets. The longitudinal axes of the cells of the honeycomb core are aligned perpendicular to the top and bottom facing sheets. Every interface between a layer of rigid corugated material or honeycomb core and any other layer of rigid corrugated material or honeycomb core is preferably occupied by an internal stiffening sheet.

9 Claims, 6 Drawing Sheets

HONEYCOMB TABLES

The present invention relates to honeycomb tables especially useful as optical tables.

Optical tables are used for supporting optical and other analytical devices that must be mounted on extremely rigid flat surfaces. Bending or twisting of the surface of the table must be minimized in order to minimize displacements of the devices relative to one another.

Historically, granite slabs have been used as optical tables. While these tables provide the flatness and rigidity required in an optical table their great weight and the difficulty of attaching components to their surfaces make them cumbersome to use.

Modern optical tables are generally of composite construction, consisting of relatively thin upper and lower metallic skins bonded to a central honeycomb core which is enclosed by a surrounding sidewall. Typically, the top surface or skin of a honeycomb optical table is furnished with a regular array of threaded mounting holes to permit the secure attachment of optical fixtures and related devices to the table top.

In optical tables of conventional construction the mounting holes (which pierce the upper skin of the table) provide access to the cells of the honeycomb core in the interior of the optical table. Thus chips and cutting oil from the manufacturing process, as well as laser dyes, oils, coolants and other debris which may come into contact with the table top during use all have access to the interior of the table. Because of the bonded construction of honeycomb tables they cannot be disassembled for cleaning. The result is a reservoir of contamination, in the interior of the table, incompatible with many of the uses to which the table is to be put. Liquids, vapors, and particles that enter the interior of the table during manufacture or use may later escape and contaminate clean rooms, vacuum rooms, or clean optical surfaces.

Various methods of construction are known that limit the entry of contaminants into the interior of a honeycomb optical table. In U.S. Pat. No. 4,621,006 a process is described wherein honeycomb tables with apertured table leaves are rendered clean-room compatible by sealing the honeycomb cells against the table leaf apertures inside the table leaf. A sealant covering the inside surface areas of the table leaf at the honeycomb core may be employed for releasably covering the table leaf apertures. Alternatively, the honeycomb cells may be sealed at a level thereof spaced from the table leaf by a distance several times smaller than a distance between the table leaf and a facing sheet spaced from such table leaf by the honeycomb core. U.S. Pat. No. 4,645,171 describes a honeycomb optical table wherein each hole in the top surface is sealed off from the interior of the table by a closed cavity enclosure which is secured to the underside of the top skin in registration with each hole.

The invention features a honeycomb optical table including a top facing sheet that may be perforated with holes, a bottom facing sheet, at least one layer of rigid corrugated material comprised of valleys and crests, at least one layer of honeycomb core, and at least one internal stiffening sheet in a permanently laminated composite. The longitudinal axes of the crests and valleys of the rigid corrugated material are aligned parallel to the top and bottom facing sheets. The longitudinal axes of the cells of the honeycomb core are aligned perpendicular to the top and bottom facing sheets. Every interface between a layer of rigid corrugated material or honeycomb core and any other layer of rigid corrugated material or honeycomb core is occupied by an internal stiffening sheet.

In specific embodiments the honeycomb optical table includes, in the following order, a top facing sheet that may be perforated with holes, a layer of rigid corrugated material, an internal stiffening sheet, a layer of honeycomb core, a second internal stiffening sheet, a second layer of rigid corrugated material, and a bottom facing sheet.

In other specific embodiments the honeycomb optical table includes, in the following order, a said top facing sheet that may be perforated with holes, a layer of rigid corrugated material, an inner stiffening sheet, a layer of honeycomb core, and a said bottom facing sheet.

In other exemplary embodiments the honeycomb table includes a plurality of bars pierced with threaded holes. The bars reside in the valleys of the layer of rigid corrugated material that is adjacent to the top facing sheet and are securely fixed to the inner side of the top facing sheet. The threaded holes of the bars are in register with the holes in the top facing sheet. In some embodiments the threaded holes in the bars do not extend all of the way through the bars.

In some other embodiments the bars reside in the crests of the layer of rigid corrugated material adjacent to the top facing sheet and are securely fixed to the upper inner surface of the layer of rigid corrugated material with the threaded holes of the bars in register with the holes in the top facing sheet.

In other embodiments the honeycomb table includes a plurality of cup assemblies. Each cup assembly is constructed of a plurality of cups connected to one another along a curve. The cup assemblies reside in the valleys of the rigid corrugated material adjacent to the top facing sheet and are securely fixed to the inner side of the top facing sheet with the cups in register with the holes in the top facing sheet.

In some other embodiments the cup assemblies reside in the crests of the layer of rigid corrugated material adjacent to the top facing sheet and fixed to the upper inner surface of the layer of rigid corrugated material, with the cups in register with the holes in the top facing sheet.

The interior honeycomb core of the optical table of the invention is sealed in a way that prevents the entry or exit of substances that can contaminate clean rooms, vacuum rooms, and other similar environments. The internal stiffening sheets, the corrugated material, the drilled and tapped bars, and the series of connected cups of various embodiments help prevent contamination of the interior of honeycomb tables and facilitate removing debris. The design of the optical table of the invention facilitates drilling and tapping mounting holes in the top surface of the table during manufacture without contamination of the interior honeycomb core. The construction of the optical table of the invention also results in greater flexural stiffness than is found in conventionally constructed honeycomb tables of equivalent thickness. The internal stiffening sheets significantly increase the flexural stiffness of the table with only minor increases in weight. Some embodiments of the invention allow the use of very thin top facing sheets without weakening the point of attachment for accessory devices.

BRIEF DESCRIPTION OF THE DRAWINGS

Other features, objects, and advantages will become apparent from the following detailed description when read in connection with the accompanying drawings in which:

With reference to FIGS. 1 and 2 the optical table 10 comprises a top facing sheet 20, a bottom facing sheet 30, rigid corrugated sheets 40, a rigid honeycomb core 50, and internal stiffening sheets 60, in a laminated composite construction. The top facing sheet 20 is perforated with a regular array of drilled, tapped holes 22. The longitudinal axes of the crests 42 and valleys 44 of the rigid corrugated sheets 40 are arranged parallel to the planes of the top facing sheet 20, bottom facing sheet 30, and internal stiffening sheets 60. The depth of the corrugations in the rigid corrugated sheets is preferably shallow so that spills or debris entering through the mounting holes can be easily vacuumed or siphoned out through the mounting holes or the ends of the horizontal channels comprising corrugations in corrugated sheets 40. The longitudinal axes of the cells 52 of the honeycomb core 50 are aligned perpendicular to the planes of the top facing sheet 20, bottom facing sheet 30, and internal stiffening sheets 60.

Figure 3:
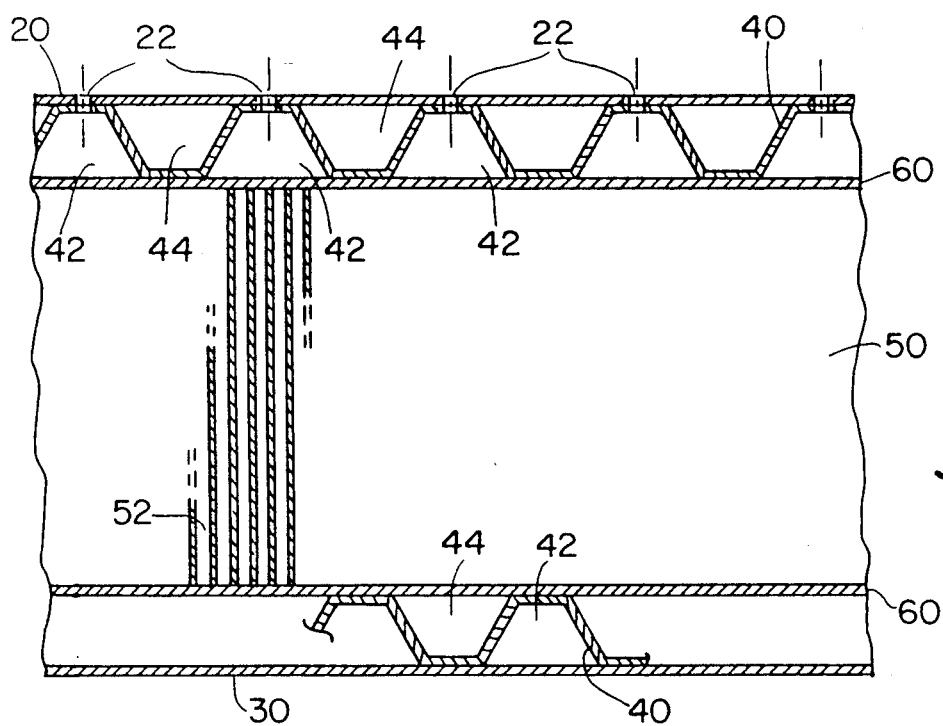
FIG. 3 is a partial side section of an alternative embodiment.

The mounting holes in the top facing sheet may be drilled and tapped before or after assembly with the rigid corrugated sheets, internal stiffening sheets, and honeycombs. Preferably the mounting holes should be in a pattern of rows which coincide with the valleys of the rigid corrugated sheet. If the mounting holes lie over a crest of the rigid corrugated material adjacent the top covering sheet then the mounting holes also extend through the adjacent layer of rigid corrugated material, as shown in FIG. 3. If drilling and tapping is performed first, then the inside of the facing sheet is easily cleaned prior to lamination with the corrugation. Since the internal stiffening sheet effectively seals the inner core of the optical table and protects against contamination, drilling and tapping may be performed after assembly. If drilling and tapping is performed after assembly, the manufacturing debris will be trapped in the valleys (or crests) of the corrugation and can be readily cleaned by blowing or evacuating air through each valley (or crest). Furthermore, if the assembly is placed on edge, so that the crests and valleys of the corrugation are perpendicular to ground, the drilling and tapping operations will be substantially self cleaning because chips and debris both inside and outside the table will fall to the ground due to gravity. After assembly and cleaning the open table sides may be enclosed with metal, wood, or plastic to achieve a finished appearance.

The top and bottom facing sheets may be fabricated from sheets of carbon steel, stainless steel, aluminum, or other suitable material typically approximately 3/16 to 1/2 inch in thickness. The rigid corrugated sheets and the honeycomb core may be formed from "tin-plate" (typically 0.010 inch steel electroplated with tin), aluminum, or other suitable material. It is convenient to fabricate internal structure by aligning honeycomb core between sections of rigid corrugated sheets. The internal stiffening sheets may be formed from a strong bondable material e.g., carbon steel or aluminum sheets typically approximately 1/32 to 1/16 of an inch in thickness. The composite assembly of facing sheets, rigid corrugated sheets, honeycomb cores, and internal stiffening sheets is preferably permanently laminated together e.g., by bonding with high strength adhesives or epoxy, by welding, by riveting or other suitable means.

Figure 1:
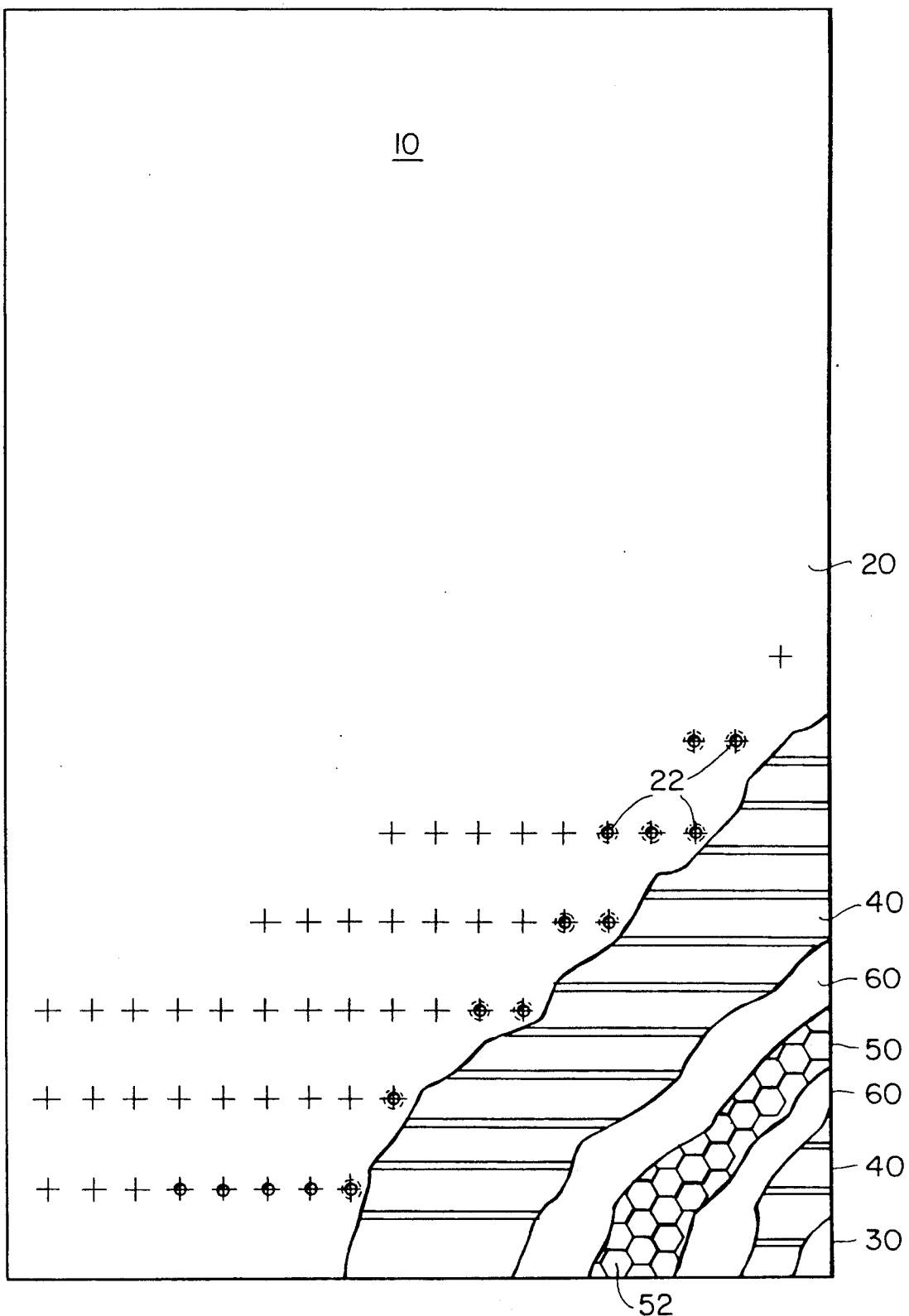
FIG. 1 is a plan view of the top surface and of a portion of the interior of an exemplary embodiment.
Figure 2:
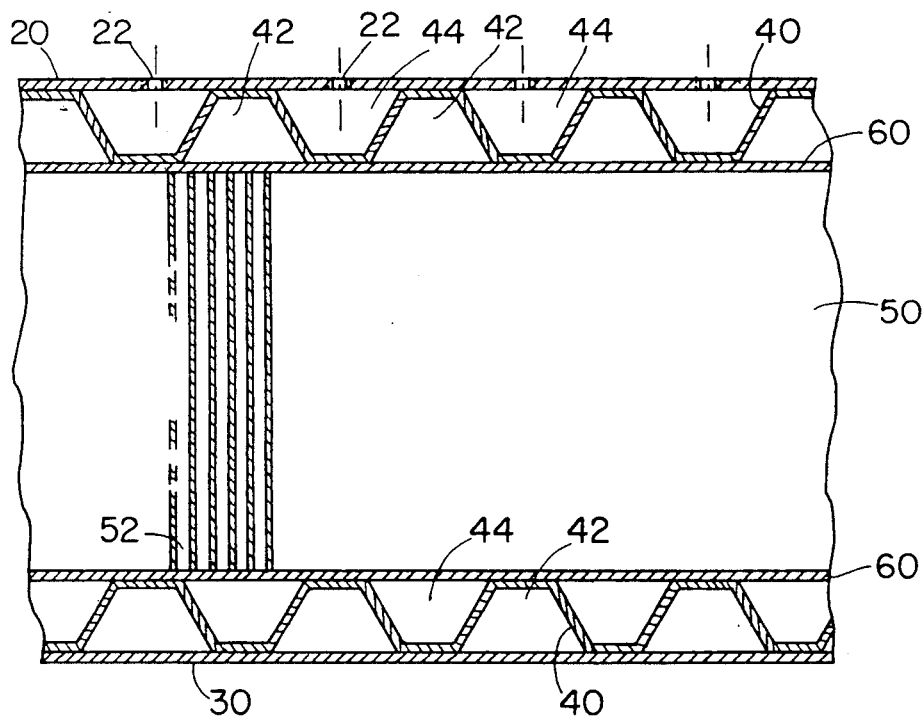
FIG. 2 is a partial side section of an exemplary embodiment.
Figure 4:
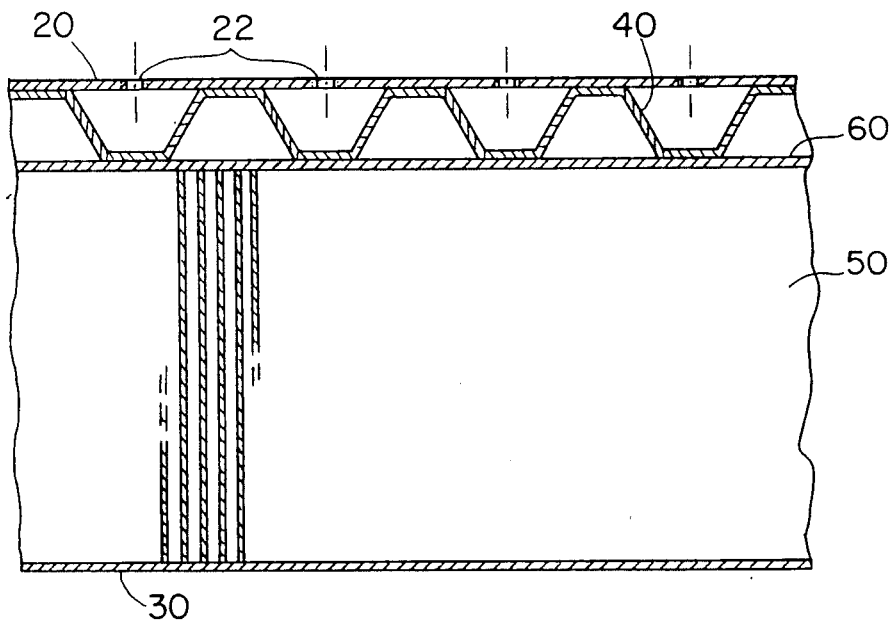
FIG. 4 is a partial side section of another embodiment.
Figure 5:
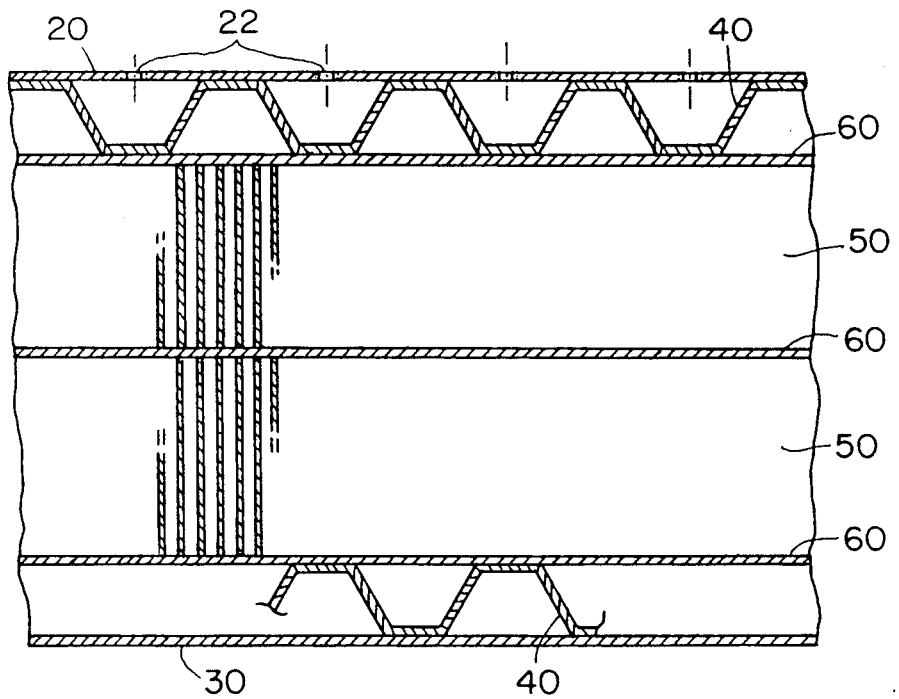
FIG. 5 is a partial side section of yet another embodiment.
Figure 6A:
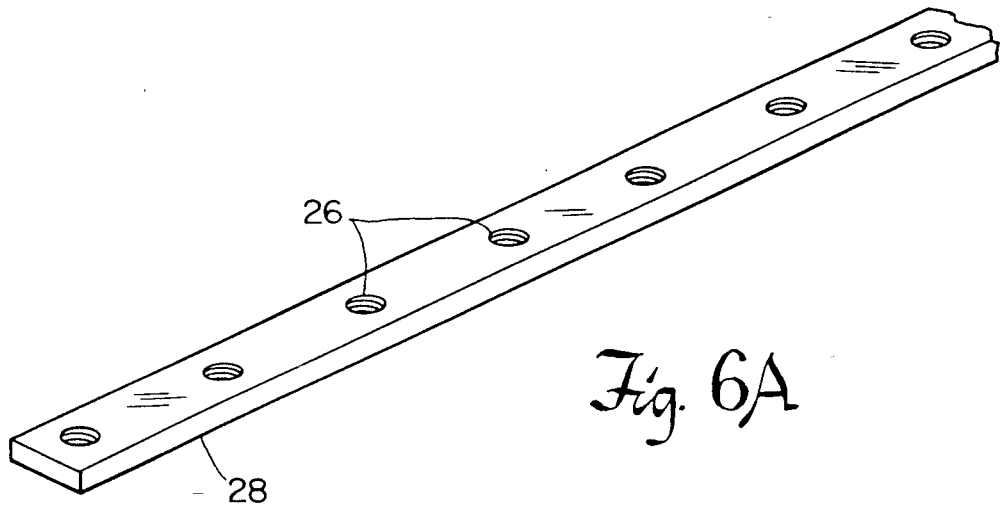
FIG. 6A is a ¾ view of the drilled and tapped bar and FIG. 6B is a partial side section of an embodiment using the drilled and tapped bar.
Figure 6B:
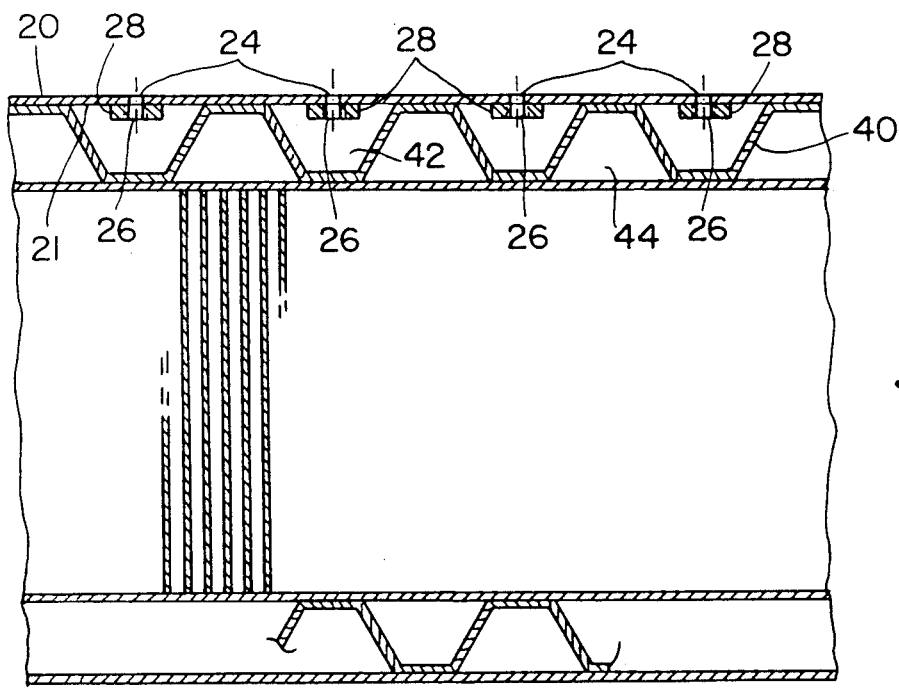
Figure 7A:
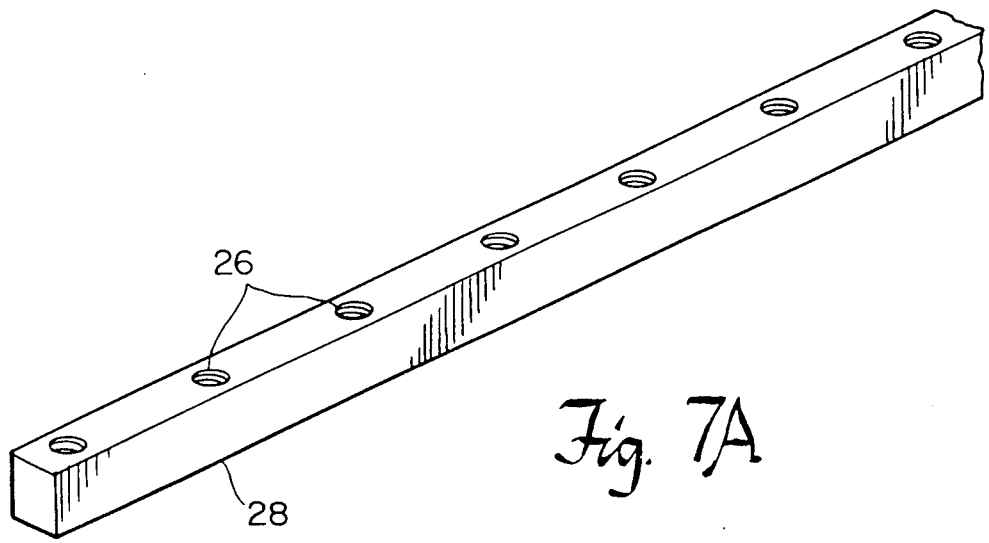
FIG. 7A is a ¾ view of an alternative embodiment of the drilled and tapped bar and FIG. 7B is a partial side section of an embodiment using the drilled and tapped bar.
Figure 7B:
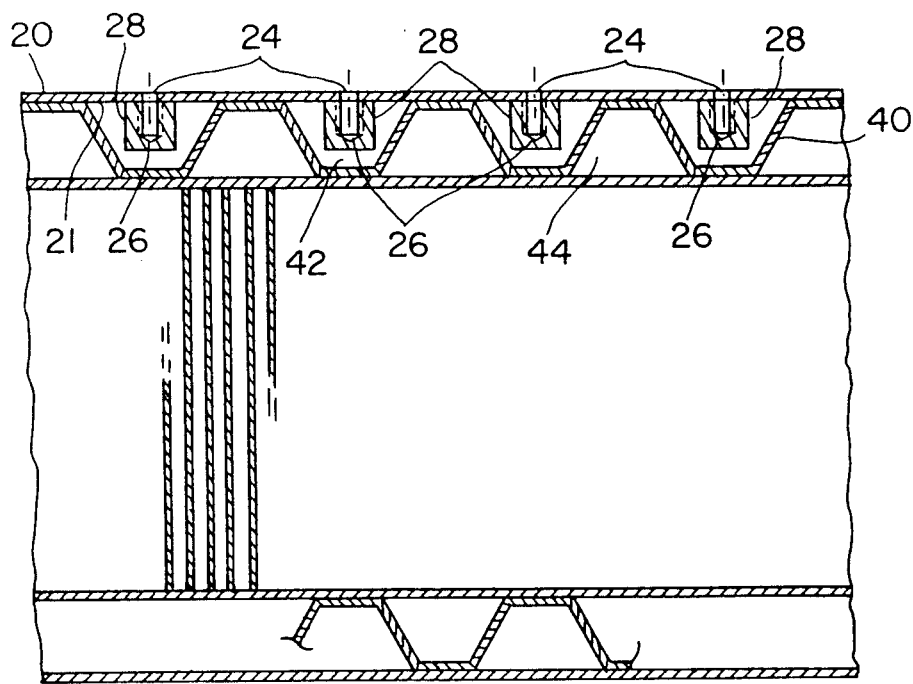

Referring to FIGS. 4 and 5, alternative embodiments of the optical table include laminated composites of top 20 and bottom 30 facing sheets, one or more layers of rigid corrugated sheets 40, one or more layers of rigid honeycomb core 50, and one or more internal stiffening sheets 60. The longitudinal axes of the crests and valleys of the rigid corrugated sheet or sheets are parallel with the top and bottom facing sheets, and the longitudinal axes of the cells of the honeycomb core or cores are perpendicular to the top and bottom facing sheets. Each layer of rigid corrugated sheet 40 or honeycomb core 50 is preferably separated from any adjacent rigid corrugated sheet or honeycomb core by internal stiffening sheets 60. Symmetrical structures, such as those shown in FIGS. 2 and 5, are believed to be more resistant to flexing due to temperature changes.

In other embodiments, as shown in FIGS. 6A, 6B, 7A and 7B, mounting holes 24 are drilled in the top facing sheet 20 but are not tapped. Threaded holes 26 are provided in bars 28 inserted lengthwise into the valleys 42 or crests 44 of the rigid corrugated sheet 40 adjacent to the top facing sheet 20 and in register with the drilled holes 24 of the top facing sheet. The drilled and tapped bars 28 are firmly secured to the inner side 21 of the top facing sheet (or to the equivalent surface of the rigid corrugated sheet if the bar is placed in the crest), e.g., by high strength adhesive, epoxy, welding, or other suitable means. These configurations allow for a thinner top facing sheet and thus have utility in applications where minimizing the weight of the table is of critical importance. They are also useful where particularly secure attachment of accessory devices is desired. The embodiment shown in FIG. 7A and 7B, where the drilled tapped holes 26 are blind, helps prevent the entry of any contamination into crests and valleys of the rigid corrugated sheet.

Figure 8A:
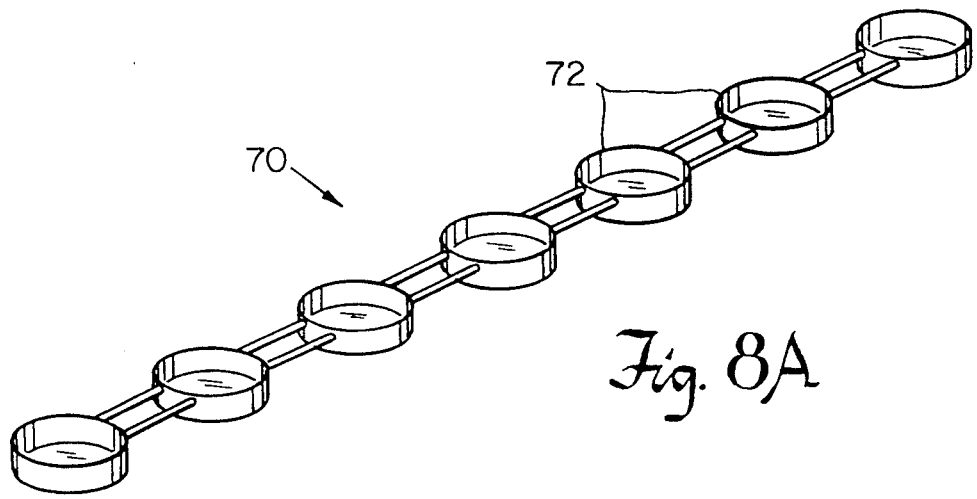
FIG. 8A is a ¾ view of an assembly of connected cups and FIG. 8B is a partial side section of an embodiment using the assembly of connected cups.
Figure 8B:
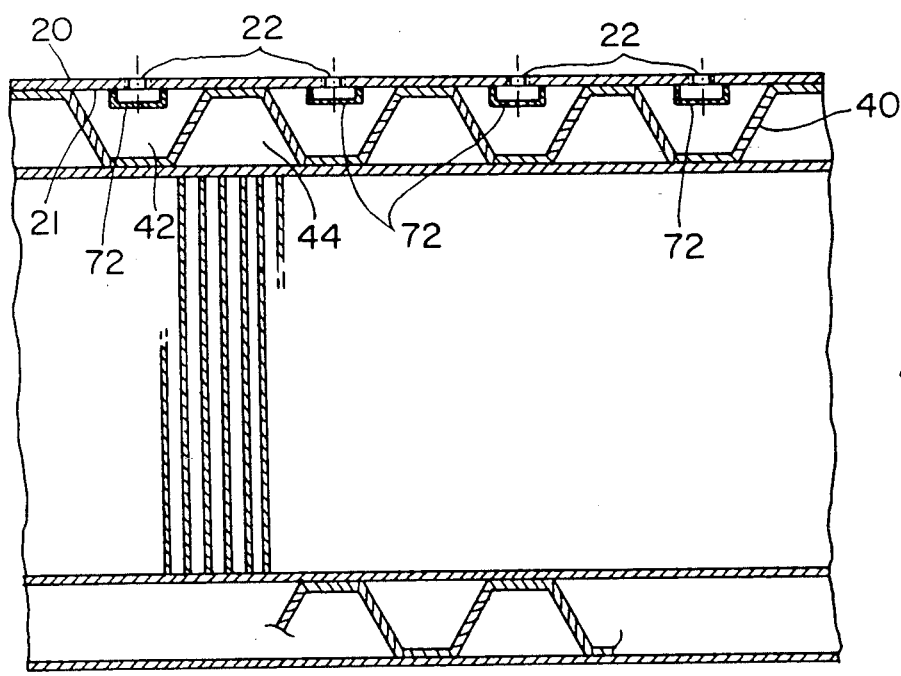

In other embodiments, as shown in FIG. 8A and 8B, an assembly 70 of metal or plastic cups 72 connected in a series and with spacing corresponding to the mounting holes 22 in the top facing sheet 20 may be inserted lengthwise in the valleys or crests 42 of the rigid corrugated sheet 40 beneath the top facing sheet 20. The assembly 70 is firmly secured to the underside 21 of the top facing sheet 20 (or to the equivalent surface 23 of the rigid corrugated sheet if the bar is placed in the crest) in registration with the mounting holes 22. The assembly of cups 70 serves to localize and confine spills and dirt to the vicinity of entrance into the table and thus facilitate cleaning.

Other embodiments are within the claims.

What is claimed is:

1. A honeycomb table having at least a width dimension comprising a top facing sheet that may be perforated with openings having a top surface for supporting components and a bottom surface;

a bottom facing sheet parallel to said top facing sheet;

at least a first layer of rigid corrugated material comprised of valleys and crests with each valley and crest having a longitudinal axis to define continuous parallel channels extending for at least a distance corresponding substantially to the width of said table beneath said top facing sheet;

at least a first layer of honeycomb core having cells of equal length extending between continuous flat top and bottom surfaces with each cell having a longitudinal axis and between said first layer of rigid corrugated material and said bottom facing sheet;

said first layer of rigid corrugated material being secured to said bottom surface and between said top facing sheet and each layer of honeycomb core wherein the longitudinal axes of said crests and said valleys of said rigid corrugated material are aligned generally parallel to said top and said bottom facing sheets, and the longitudinal axes of the cells of said honeycomb core are aligned perpendicular to said top and said bottom facing sheets.

2. The honeycomb table of claim 1 and further comprising, at least one internal stiffening sheet at the interface between a layer of honeycomb core and layer of rigid corrugated material, said sheets and layers being secured together.

3. The honeycomb table of claim 2 comprised of, in the following order:

(a) said top facing sheet;
(b) a layer of rigid corrugated material;
(c) an internal stiffening sheet;
(d) a layer of honeycomb core;
(e) a second internal stiffening sheet;
(f) a second layer of rigid corrugated material; and
(g) said bottom facing sheet.

4. The honeycomb optical table of claim 2 comprised of, in the following order:

(a) said top facing sheet;
(b) a layer of rigid corrugated material;
(c) an inner stiffening sheet;
(d) a layer of honeycomb core; and
(e) said bottom facing sheet.

5. The honeycomb table of claim 1 wherein said top facing sheet has openings and further comprising a plurality of bars pierced with threaded holes, said bars residing in said valleys of said rigid corrugated material adjacent to said top facing sheet and securely fixed to the inner side of said top facing sheet, said threaded holes of said bars being in register with said openings of said top facing sheet.

6. The honeycomb table of claim 5 wherein said threaded holes in said bars extend only partially through said bars.

7. The honeycomb table of claim 5 wherein said plurality of bars reside in said crests of said layer of rigid corrugated material adjacent to said top facing sheet and securely fixed to the upper inner surface of said layer of rigid corrugated material, said threaded holes of said bars in register with said openings of said top facing sheet.

8. The honeycomb table of claim 1 wherein said top sheet has openings further comprising a plurality of cup assemblies, each of said cup assemblies comprising a plurality of cups connected to one another along a curve, said cup assemblies residing in said valleys of said layer of rigid corrugated material adjacent to said top facing sheet and securely fixed to the inner side of said top facing sheet, said cups in register with said openings in said top facing sheet.

9. The honeycomb table of claim 8 wherein said plurality of cup assemblies reside in said crests of said layer of rigid corrugated material and fixed to the upper inner surface of said layer of rigid corrugated material, said cups in register with said openings in said top facing sheet.

* * * * *